Oct. 23, 1945.    T. B. WOOLLEY    2,387,707
INTERNAL-COMBUSTION ENGINE
Filed Dec. 26, 1942    3 Sheets-Sheet 1

Travis B. Woolley INVENTOR.
BY [signature]

Travis B. Woolley INVENTOR.

Oct. 23, 1945.　　　　T. B. WOOLLEY　　　　2,387,707
INTERNAL-COMBUSTION ENGINE
Filed Dec. 26, 1942　　　　3 Sheets-Sheet 3
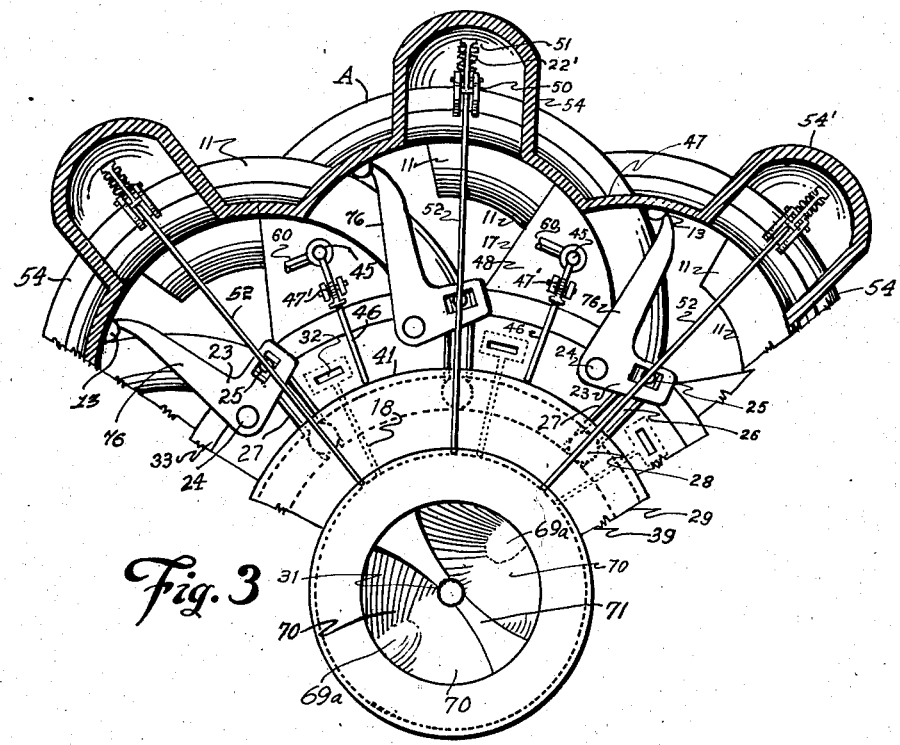
Travis B. Woolley INVENTOR.
BY John M. Spellman Patented Oct. 23, 1945

2,387,707

UNITED STATES PATENT OFFICE 2,387,707

INTERNAL-COMBUSTION ENGINE

Travis Bain Woolley, Dallas, Tex.

Application December 26, 1942, Serial No. 470,168

12 Claims. (Cl. 123—8)

My invention relates to internal combustion engines, and the primary object thereof is to provide an improved construction of engine of this character whereby a maximum amount of power may be obtained from the amount of fuel consumed, per pound of engine weight.

The attainment of this primary object is effected principally by providing power means mounted on the engine housing and shaft and utilizing the space enclosed by the housing for the use of auxiliary power means partly formed by and cooperating with the first-named power means to secure increased power of the engine. The invention provides a new and improved engine which includes a plurality of reciprocatory pistons disposed in appropriate cylinders mounted on the housing and operating to apply explosive power directly to a motion transmitting member on the engine shaft, and cooperating abutment means for subdividing the space enclosed by the housing into explosion chambers or compartments and also transmitting working impulses to and through the motion transmitting member to the engine shaft.

The invention further provides novel means for supplying charges of a motive fuel to the cylinders and explosion chambers and igniting the same at proper time periods, exhausting the spent gases from the cylinders and chambers, and utilizing the motion transmitting member on the engine shaft as a constituent part of means for operating or controlling the operation of the pistons and abutment means for motive fuel charging actions.

The construction of the engine also provides for a more direct means for utilizing centrifugal force for circulating a cooling agent for cooling certain areas of the engine, and in general provides a more powerful engine without increase in weight as compared to the power and weight of the internal combustion engines in common use.

The combination and arrangement of parts in the construction of the engine provides what may be termed inner and outer engines for jointly producing and transmitting a greater number of power impulses to the engine shaft on each working cycle, this term being made more apparent as the description of the invention proceeds.

Other objects of the invention will be hereinafter more fully set forth or will become apparent from a perusal of the following detailed description, taken in connection with the accompanying drawings, in which:

Fig. 3 is a fragmentary sectional side view of the engine, the plane of section being substantially on the line 3—3 of Fig. 2;

Fig. 4 is an enlarged perspective view of one of the auxiliary pistons and its rocker arm;

Fig. 5 is a perspective view of one of the main pistons.

Figure 1:
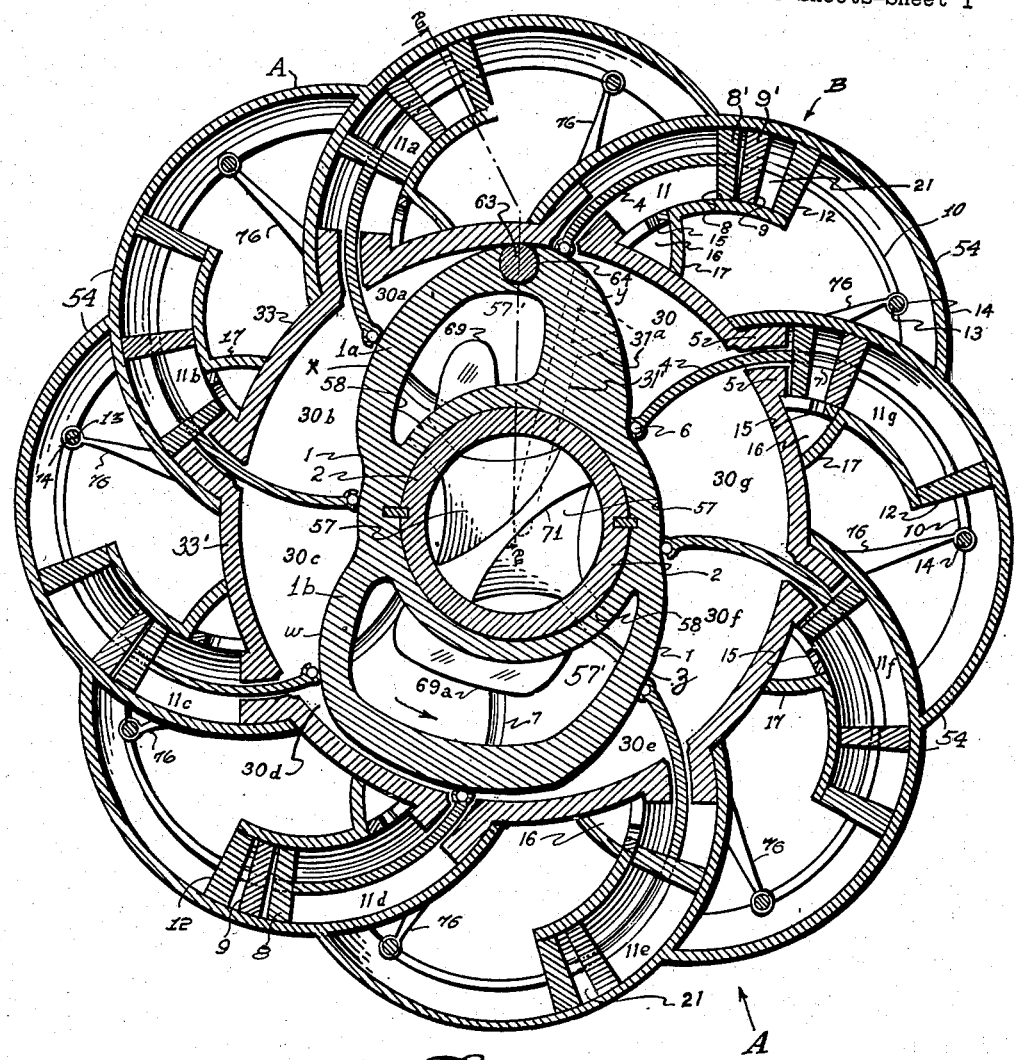
Fig. 1 is a vertical sectional view of my engine taken on a line at right angles to the engine shaft and showing the shaft, its motion transmitting cam, cylinders and pistons, and related parts.

In carrying out the invention, I provide a casing or housing indicated in entirety at A, the inner cylindrical central wall portion 33 of which forms an enclosure for certain working parts of the engine and also forms the main chamber of the inner engine, this chamber 33' being divided by a motion transmitting cam member 1 and reciprocatory abutment members 4 into an annular series of explosion chambers or compartments, as indicated at 30, 30a, 30b, 30c, 30d, 30e, 30f and 30g, respectively.

The cam 1 is mounted on the hollow drive shaft 2, and this cam is of double-lobed formation, or provided with two lobes or wings 1a, 1b projecting beyond diametrically opposite sides of the shaft. The cam carries at the outer or point end of its lobe 1a a wear-sustaining bushing or roller 63 disposed in a recess 64 for contact with the inner surface of the casing or chamber wall 33 and to serve as a sealing member. At 31 is shown in broken lines in Fig. 1 a fuel intake passage for supply of motive fuel to the explosion chambers or compartments of the inner engine, this being a drilled passage through the shaft 2 and cam 1 which opens at its delivery end through one side of the periphery of the cam in rear of the bushing or roller and which leads outward at one end of the shaft and is suitably connected in practice at its receiving end with a fuel supply pipe or carburetor (not shown) suitably supported on the engine.

The engine is provided with a plurality of cylinders indicated respectively at 11, 11a, 11b, 11c, 11d, 11e, 11f, and 11g, each cylinder having operating therein a main piston 8 and an auxiliary piston 9. The main pistons 8 consist of the piston heads 8' which are fixed to the outer ends of the arms 4 movable therewith in the cylinders. These arms project through guide openings at the inner ends of the cylinders into the chamber 33' and are provided at their inner ends with contact heads or rollers 6 for engagement with the peripheral surface of the cam 1. The cylinders are closed at their inner ends, except for the guide openings, by bosses or projections 5 formed on the casing wall 33, in which bosses or projections the guide openings are formed, and each cylinder is provided at its outer end with a closure head 12. A port 77 is provided in each arm 4 to connect the portions of the cylinder on opposite sides of the arm. The cylinders, pistons and abutment arms or members, together with co-acting parts hereinafter described, constitute what I term the outer engine. The arms 4 in the operation of the pistons transmit power from the main pistons 8 to the surface of the cam 1 in such manner as to rotate the cam, which is keyed to the drive shaft 2.

The cam 1, cylinders, pistons and abutment members 4, which latter with the cam 1 divide the main chamber 33' into the explosion chambers 30—30g, together with coacting parts hereinafter described, constitute what I term the inner engine, in the operation of which the abutments, under the force of explosions in these explosion chambers, transmit working impulses through the cam 1 to the shaft 2 to give added power to the engine.

It will be noted that the drawings show the cylinders of the outer engine and the piston arms or abutments 4 as segmentally curved and the cylinders disposed in lapping relation to each other about the casing or housing 33 merely to indicate the possibility of saving space by the use of curved cylinders and similarly shaped arms 4. However, these cylinders and arms may be straight if space thus occupied would not be at a premium. Also it is to be understood that the number of cylinders may be varied as desired.

Figure 4A:
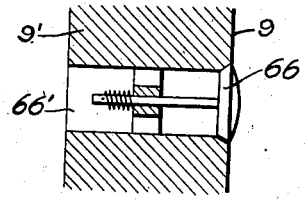
Fig. 4a is a detail section through the piston shown in Fig. 4 and taken on the line 4a—4a of Fig. 4.

The auxiliary pistons 9 consist of the heads 9' which are fixed to the inner ends of arms 10, which are segmentally curved, like the arms 4, but which are longitudinally slotted or formed of spaced side bars or members 10' providing a passage 10a for connecting portions of the cylinders lying on the inner and outer sides of the arms. The heads 9' of the pistons 9 are arranged and movable in the cylinders between the heads 8' of the pistons 8 and the cylinder heads 12. The head 9' is provided with a fuel feed port or passage 66' opening through its inner and outer faces and into passage 10a. A check valve 66, shown particularly in Fig. 4a, controls this port or passage for compression of a fuel charge between the heads 8', 9' of the pistons in each cylinder and the feed of the charge into the combustion chamber 21 of the cylinder between the piston head 9' and cylinder head 12, as hereinafter described.

Guide and sealing grooves 7 are provided in the side walls of the cylinders, and these grooves extend outwardly in the cylinder housing walls 54 beyond the cylinder heads 12. The side edges of the arms 4 and 10 are fitted to slide snugly in these grooves, in which the arms 10 may travel outwardly beyond the heads 12 to allow the piston heads 9' to come in close relation to the heads 12 for the final compression of the charges in chambers 21. Ball bearings 4a are fitted in grooves or raceways 4b in the arms 4 and similar bearings 10b are fitted in grooves or raceways 10c in the arms 10, which grooves or raceways are closed at the ends of the arms, and these bearings engage the walls of the grooves 7 to adapt the pistons to travel with ease and a minimum degree of friction. Packing strips 10d, which extend the full length of the arms 10 and bear on the walls of the grooves 7, may be used to make a fluidtight seal between the cylinders and arms. It will be understood that ports 77 in arms 4 and passages 10a in arms 10 insure even pressure of the motive fluid in the cylinders adjacent the opposite faces of the arms to prevent the pistons from binding and reduce friction between the pistons and walls of the cylinders. The outer ends of the arms 10 carry pivot or journal pins which are engaged by journal sleeves 13 on the adjacent ends of rocker arms or levers 76 which control the movements of the pistons 9 relative to the pistons 8 for charge forming and motion transmitting actions.

Formed in each of the cylinders is a T-shaped fuel inlet port 15 which is in communication with a primary fuel compression chamber 16 formed by portions of the cylinder wall, the casing wall 33 and wall portion 17 of the housings 54, as shown in Figs. 1 and 3, into which compression chamber fuel for the formation of fuel charges in the cylinder is supplied through a supply pipe 60 and valve 45 of suitable type actuated by a rocker arm 47' periodically operated, as hereinafter described. Pipes 60 in practice may be connected with a manifold supplied from a carbureter or other suitable fuel supplying device. Each explosion compartment 30—30g is supplied with fuel at a proper time period through the feed passage 31 which extends inward longitudinally from one end of the shaft to about its center and thence, as shown at 31', radially through the shaft and lobe 1a of the cam 1 and terminates in spaced delivery branches 31a opening through the periphery of said lobe into the chamber 33', in rear of the contact point of the lobe in the direction of rotation of the cam. The fuel in the counterclockwise rotation of the cam is successively supplied to each explosion compartment 30, 30g. At its outer or intake end the passage 31 may be suitably connected with a carbureter or other fuel supplying means. The shaft 2 is provided at its end, opposite the end at which the intake end of the fuel supply passage 31 is located, with air inlet passages 57, and is provided at its first named end with air outlet passages 70. These passages are separated from each other by a suitably formed partition 71, but the passages 57 communicate through ports 58 with cooling chambers 57' formed in the lobes of the cam and said chambers communicate in turn through outlets 69, 69a with the passages 70. In the rotation of the cam air is drawn into the passages 57 and forced into the chambers 57' and discharged through the outlets 69, 69a and passages 70, thus cooling the shaft and cam to a desirable degree. Spark plugs 42 or other igniters may be used, one for each cylinder 11, 11g, and one for each compartment 30—30g, to ignite the fuel charges.

Figure 2:
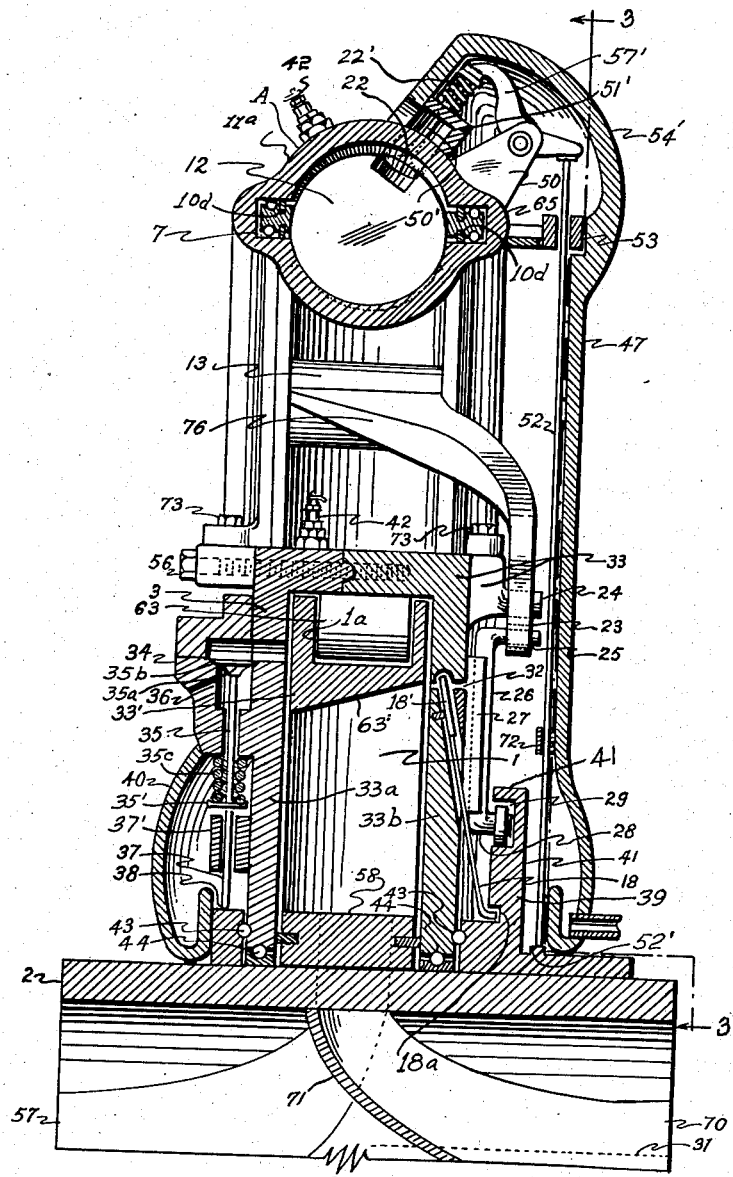
Fig. 2 is a transverse vertical sectional view taken substantially on the line 2—2 of Fig. 1.

Figs. 2 and 3 show the valve mechanism of the engine, and Fig. 2 the construction of the casing or housing 33 which is formed of circumferentially divided sections 33a, 33b joined together by stud bolts 56. In Fig. 2 are also shown the main ball bearings 44 between the casing 33 and the drive shaft 2. Thrust bearings between the sections of the casing 33 and a cam wheel 38 and a race cam 39 are shown at 43, and similar bearings between the casing sections and shaft 2 are shown at 44. The valve assembly includes a push rod 37 movable in a guide 37' and riding at its lower end on the cam track 38, and an exhaust valve operated thereby consisting of a valve stem 35 having at its lower end a disk or head 35' engaged by the upper end of said push rod 37 and carrying at its upper end a valve 35a engageable with a seat 35b and normally seated by a spring 35c to close an exhaust passage 34 leading from the chamber 33' to a final exhaust port 36 in the casing section 33a, rod 37 being actuated by the uneven track of the cam wheel 38 to open the valve against the resistance of the spring at proper intervals. An oil-tight housing 40 encloses the guide 37', cam 38 and the head 35' and exposed portions of the rod 37 and stem 35. An exhaust passage 34, controlled by a valve mechanism of the character described, is provided for the discharge of spent gases from each compartment, which passage is closed by a portion of the adjacent side of the cam when the compartment is being charged with fuel and while the charge is being fired for an impulse action, the passage being then exposed by the cam for exhaust of the waste gases by the opening movement of the valve 35a.

The controlling arm or lever 76 which is pivotally connected at one end to the outer end of the guide arm 10 of each auxiliary piston 9 is pivoted at its opposite end on an extension pin 24 mounted on the casing section 33b and has an angular extension or crank portion 23. The center of the extension pin 24 is likewise the center of the arc of the cylinder, as cylinder 11, in which the piston is mounted. This extension 23 is slotted to receive a pin 25 on the upper end of a push and pull rod 26 which is mounted to slide in a guideway 27, and which is provided at its lower end with a roller 28 which travels in a cam groove 29 in the cam wheel 39, whereby the arm or lever 76 is operated to move the auxiliary piston 9 inwardly and outwardly in its cylinder for fuel admission and compression and impulse actions.

As previously described, a valve 45 communicates with each compression chamber 16 and controls the supply of fuel thereto from a supply pipe 60, the valve being normally spring closed and opened and allowed to close at proper time periods by means of the rocker arm 47' engaged by the upper end of a rod 46 engaging at its lower end a cam surface 41 on the cam wheel 39, whereby valve controlling movements are imparted to the rod. A push rod 52, mounted in guides 53 and 72 and riding at its lower end on a cam surface 52' of the cam wheel 39, is provided for operating an exhaust valve device 22, one connected with each cylinder 11—11g. The rod engages at its upper end a rocker arm 51 mounted on a bracket 50 and engaging the stem 50' of the valve 22, which is slidable in a guide 51', the valve controlling an exhaust port in the cylinder and being normally held closed by a spring 22'. A cover or housing 54' encloses the rocker arm and associated parts of the exhaust valve and connects with a main housing part 47 which encloses all of the valve operating parts and cam assemblies above described at the adjacent side of the engine.

An oil feed port 32 is provided in the casing part 33b for supply of lubricating oil to the chamber 33' and the surfaces of the cam 1. A valve 18' disposed at the upper end of a push and pull rod 18 controls this port. The lower end of this rod engages a cam groove 18a in the cam wheel 39, whereby the valve is reciprocated to cover and uncover the port 32 at proper intervals. Oil may be supplied to the port 32 from the interior of the housing 47 or from any other suitable source of supply. As shown, flanges and stud bolts 73 at the bases of cylinders 11—11g secure the cylinders to the casing sections 33a, 33b.

A slight slanting or sloping position of the inside surface of the cam 1 is indicated at 63' in Fig. 2 immediately below the roller 63 which acts as a deflector to guide the cooling air flowing through the cam and to conduct lubricating oil from the casing side 33b through which it is supplied toward the side 33a, in order to secure an even distribution of the oil at both sides of the casing and cam.

Reference has heretofore been made to the curved form of the cylinders of the outer engine and that the cylinders may be straight. In the latter case the construction and operation of the parts described herein would be the same except that other means operated by the pull-push rod 26 might be used in place of parts 76, 23 to control the movements of the auxiliary pistons. It is also obvious that slight rearrangements in positions of valve assemblies would be required, but their function would remain the same as previously described.

In the operation of the outer engine, and with the roller 63, in cam, assumed to be at 0 degrees, Fig. 1, there is a motive impulse on the cam for each twenty-two and one-half degrees counter-clockwise movement of the cam 1. At the position shown in Fig. 1, heads 8' and 9' of the pistons 8 and 9 in cylinder 11, at B are in firing position at the beginning of their power stroke as the result of combustion in the combustion chamber 21 of cylinder 11, the pistons 8 and 9 being movable conjointly under the pressure on their heads toward the inner end of the cylinder. Thus piston head 8' of the piston 8 in said cylinder transmits motion to its arm 4 and arm 4 transmits movement to the cam 1 to rotate it in counter-clockwise direction, and the shaft 2 being keyed to the cam 1 also moves in counter-clockwise direction.

With this understanding the general operation of my novel and improved double engine is as follows:

The engine structure as disclosed embodies, as stated, an "outer engine" comprising eight outer cylinders and pistons operating therein, and an "inner engine" comprising eight combustion chambers and coacting movable abutments, which abutments act not only as combustion chamber forming members but as motion transmitting members for transmitting the impulse forces from the pistons to the cam 1. The cam is provided with peripheral surfaces $w$, $x$, $y$, $z$ suitably formed to receive the impulse forces from the pistons through the abutments and the working pressure from the combustion of the charges in the combustion chambers and to force the abutments outwardly and permit them to be moved inwardly so that the cylinders and chambers will operate in timed order and so that pistons 8 may be operated in properly timed relation to the pistons 9. The working operations are such that the cylinders of the cylinder group are fired on each twenty-two and one-half degree movement of the cam 1 in its counter-clockwise orbit of rotation. The cylinders each have a complete four-cycle action on each 180° part of the orbit of rotation of the cam 1 in which a charge is admitted thereto, the charge compressed, then fired and the spent gases exhausted, and these operations are repeated on the next 180° part of the orbit of rotation of the cam 1. Thus on each complete rotation of the cam and shaft sixteen working pulses will be delivered by the cylinders and pistons. Fig. 1 shows the parts arranged in a position in which the point of cam lobe 1a has passed just slightly beyond the highest point in its orbit of rotation and cylinder 11 has just been fired and cylinder 11d is in readiness for the firing of the charge therein on about a 20° further clockwise movement of the cam from this position and the other cylinders are at various other stages in their working operations.

In the following more specific description of the operation of the working parts, (cylinders and pistons) of the outer engine, it is to be understood with respect to each cylinder, and taking cylinder 11 as an example, that piston 8 is moved outwardly in the cylinder by the action of cam 1 and inwardly in the cylinder by action of piston 9, permitted at proper time by the cam 1; that piston 9 is moved outwardly and inwardly at properly timed periods by its controlling lever 16 under the action of rod 26 and grooved surface 29 of cam 39; that valve 45 is opened and closed at proper periods by arm 47', rod 46 and cam surface 41 of cam wheel 39 to admit and then cut off the supply of motive fuel to the compression chamber 16; and that valve 22 is opened at proper time periods by rocker arm 51, rod 52 and cam surface 52' for the exhaust of waste gases from the cylinder on exhaust movement of piston 9 and then closes as said piston moves inwardly for a charge compression and feed action. When the charge is fired in cylinder 11 both pistons 8, 9 are forced inwardly (this movement of piston 9 being permitted by its cam) until they reach the inner end of the cylinder, whereby the cylinder arm or abutment 4 is caused to transmit a working impulse to cam 1. Just prior to the time pistons 8 and 9 reach the inner end of the cylinder and before piston 9 reaches the limit of its inward movement, a charge of fuel is admitted into chamber 16 and enters the cylinder between the pistons through port 15 and is compressed by the piston 9 at the final stage of its inward movement. The pistons momentarily remain stationary in a position shown, for example, in connection with cylinder 11g, and then piston 9 begins its outward traverse and sucks in the charge behind it through port 15, followed by piston 8, which further compresses the charge between the pistons. Finally, as the pistons reach the position shown in cylinder 11, the piston 8 forces the charge through the valved port 66 in piston 9 into the chamber 21 in which it is fired to transmit a working impulse to arm 4, followed by exhaust and intake actions, as before described. With this understanding of the operation of the pistons 8 and 9 in cylinder 11, which is the same as that occurring at proper time periods in each of the cylinders twice on each complete orbit of rotation of the cam 1, reference to Fig. 1 will give an understanding of the operations going on in each cylinder when the cam 1 is in the position indicated, from which the working operation of the outer engine will be readily understood. As shown, the roller 63 at the point of the cam lobe 1 is disposed at the highest point in the orbit of rotation of the cam with the surfaces y and w of the respective cam lobes 1a and 1b in impulse receiving positions. As represented, cylinder 11 has been fired and pistons 8 and 9 therein are being forced on their working stroke inwardly to impart an impulse to surface y of lobe 1a of the cam. At the same time cylinder 11a, which has been previously fired, is exhausting, its exhaust valve being open and its pistons 8 and 9 moving outwardly, piston 8 under the action of its operating means and piston 9 under pressure from the surface x of the cam. The outward movement of piston 9 causes combustible fuel to be drawn behind it into cylinder 11a from the associated chamber 16 ready to be compressed in said chamber on the ensuing inward movement of the pistons. In cylinder 11b the exhaust stroke of piston 8 is about one-half completed and piston 9 has dropped back to the inner end of the cylinder, as its abutment arm lies between the cam surfaces x and w and combustible fuel from the associated chamber 16 is being admitted between the pistons 8 and 9 in readiness for compression under action of cam surface x on the abutment 4 connected with piston 9 on a 22½° counterclockwise rotary movement of the cam 1 from the position shown in Fig. 1. In cylinder 11c a charge has been fired prior to the firing of the charge in cylinder 11, this charge having previously admitted and compressed during the travel of surface z of the cam in contact with the abutment 4 associated with the piston 9 of this cylinder, and the pistons 8 and 9 in said cylinder are shown as being on their working stroke imparting an impulse against surface w of the lobe 1b of cam 1. This stroke of the piston in cylinder 1c is completed before the pistons in cylinder 11 complete their working stroke and the pistons in cylinder 11 complete their working stroke a short time after the pistons in cylinder 11d complete their working stroke, which lapping in the duration of impulse strokes occurs in like manner with other similarly related fired cylinders in the orbit of travel of the cam 1, so that continuous power impulses are transmitted to the cam lobes 1a, 1b in the operation of the engine. In cylinder 11d compression has taken place during travel of the cam surface z in engagement with the abutment 4 associated with this cylinder, and the cylinder is in condition to be fired and is fired when cam surface w comes into engagement with the abutment 4 associated with the cylinder. In cylinder 11e the pistons are nearing the end of their compression stroke, in cylinder 11f compression is progressing, and in cylinder 11g a compressed charge from chamber 16 is entering the cylinder, and in these cylinders compression is completed by the action of the cam surface z and the cylinders are fired in succession as the cam surface w comes into engagement with their associated abutments 4. It will, of course, be understood that compression in cylinders 11a and 11b is completed by cam surface x and that these cylinders are fired when cam surface y comes into engagement with their associated abutments 4. Thus sixteen working impulses will be transmitted to the cam 1 and shaft 2 by the cylinders and pistons, one at each twenty-two and one-half degree point, on each rotation of the cam and shaft.

The preceding explanation of the operation refers to the outer engine, and I will now proceed to explain the operation of the inner engine. It will be evident from the foregoing description that the surfaces w, x, y, z of the cam 1 cause, in cooperation with the abutments 4 and coacting valve mechanism, performance of the four functions with respect to each cylinder of the outer engine in a working cycle, to wit, power impulse, exhaust, intake and compression, and it is to be understood that these cam surfaces also cooperate with the abutments 4 to perform like functions with respect to the combustion chambers 30, 30g, of the inner engine, which functions through the 360° revolution as follows: Referring to Fig. 1, it is to be understood that the arrangement is such that a spark is furnished to fire the explosive fluid compressed in each chamber as the forward portion of the surface $w$ of the cam 1 engages the abutment 4 forming the rear wall of said chamber in the direction of rotation of the cam. Thus, for example, it can be assumed that a charge compressed in chamber 30$d$ has been fired, as the forward portion of cam surface $w$ has passed the abutment 4 associated with cylinder 11$c$, which abutment forms the rear wall of said chamber 30$d$. Fig. 1 shows that the surface $y$ of cam 1 is passing through the chamber 30, of which, for the time being, it forms a wall, and that this chamber is being charged with explosive fluid through passage 31. Passage 31 is always open from the carburetor to surface $y$ of cam 1, so that, as the exhaust outlet 36 from chamber 30 is closed by its valve 35$a$ and passage 31 is the only opening to or from the chamber, the gradual enlargement of the chamber in the travel of the surface $y$ causes a partial vacuum to be formed in the chamber and a charge of explosive fluid to be fed thereto through the passage 31. With the parts arranged as shown in Fig. 1 it can be assumed that chambers 30$e$, 30$f$ and 30$g$ are charged with motive fluid, having been previously successively charged by the passage of the cam surface $y$ therethrough, and that the cam surface $z$ has fully compressed the charge in chamber 30$e$, partly compressed the charge in chamber 30$f$ and started compression of the charge in chamber 30$g$, to progressively place these charges in condition to be fired as and when the surface $w$ of the cam in turn enters said chambers and forms a component part thereof. Previous to the explosion in chamber 30$d$ explosions have occurred in chambers 30$a$, 30$b$ and 30$c$, exhaust from chamber 30$a$ is taking place and is nearly completed, its exhaust valve being open, and exhaust from chamber 30$b$ is in progress under the expressing action of cam surface $x$, its exhaust valve having shortly before been opened. In the example shown in Fig. 1 the power or impulse period in chamber 30$d$ is about 10% completed and the power or impulse period in chamber 30$c$ about 77% completed, and such an interlap in the power impulses on the cam surface $w$ occurs in adjacent chambers throughout the group of chambers whenever said cam surface passes into a chamber wherein a charge is fired while it is still traveling through a preceding chamber in which an impulse action is occurring. In Fig. 1 compression in chamber 30$e$ is about 90% completed and in chamber 30$f$ approximately one-third completed. As the cam 1 rotates surface $y$ in passing through each combustion chamber will charge it, surface $z$ will compress the charges, surface $w$ will receive the power impulses and surface $x$ will expel the exhaust gases as the exhaust valves are opened. In timing the explosion of charges in the cylinders 11, 11$g$ and chambers 30, 30$g$, the spark producing means employed may be of a kind to allow a spark to be advanced or retarded, in accordance with general practice, and the arrangement and action of the cam surfaces, valves and spark mechanism may be such that the working impulses from the cylinders and explosion chambers on the cam 1 may be so timed as to give the best working results. As before described, each of the eight cylinders employed delivers two working impulses to the cam 1 on each rotation of the cam, and each explosion chamber in the organization shown delivers a single working impulse to the cam on each rotation of the cam. Thus in the operation of the cylinders and chambers there are twenty-four power strokes delivered per revolution of the ungeared shaft 2.

While a water jacket may be added to cool the engine furnishing circulation from a water pump geared thereto, I have preferred to illustrate it as air-cooled. It will be noted that the air is taken in at point at one end of the shaft and by centrifugal action forced through to the passages 58 near the center of the shaft into the spaces or chambers 57', in which it is heated, thus reducing air weight, and the greater weight of the incoming cool air will push this air out through the discharge outlet 70. This outlet may communicate with a carburetor for supplying fuel to chambers 30—30$g$, and the air passing through the carbureter and mixed with fuel may feed back to the passage 31 and thence to the outlet branches 31', 31$a$ of the passage opening through the surface $y$ of the cam 1. At this point the air, mixed with gases, will feed from the passage 31 into the combustion chamber with which it communicates, furnishing a supercharge for said chamber. It will be understood that the engine will be equipped with two carburetors—one for the cylinders 11—11$g$ and one for the chambers 30—30$g$.

The advantages of my improved construction of engine will be evident. The constant and more even flow of energy from twenty-four "power strokes" in a four-cycle engine, as obtained in my engine, is highly advantageous in giving greater power and smoothness of operation as compared with a conventional sixteen-cylinder, four-cycle engine, giving only eight power strokes per revolution of the main shaft. It will be understood that this total is arrived at in my engine by obtaining one power stroke per chamber of the inner engine and two power strokes per cylinder in the outer engine cylinders—there being eight of each on each revolution of the engine shaft.

It will also be conceded an advantage in the construction of my engine that the more direct control of the reciprocatory pistons eliminates piston slap or sidewise friction of the pistons against the cylinder walls existing in the most popular designs in present use. This permits reduction in size or length of the pistons and closer fitting, which further reduces friction and makes for more efficient utilization of cylinder space and reduction of wear.

From the foregoing description, taken in connection with the drawings, the construction, mode of operation and advantages of my invention will be understood without a further and extended description.

While the disclosure presents a practical embodiment of an internal combustion engine of the type shown and described, it is obvious that there are many changes and alterations possible, other than those suggested, which may be employed within the scope of the appended claims.

What is claimed is:

1. In an internal combustion engine, the combination of a shaft, a motion transmitting member on the shaft, a casing, a set of cylinders mounted thereon, inner and outer pistons in each cylinder jointly movable in one direction under force of the explosion of a combustible charge in the cylinder and movable independently in timed order in the opposite direction to admit a combustible charge between the inner and outer pistons and force it through the outer piston and compress it for a subsequent explosion in the cylinder, motion transmitting abutments for transmitting motion from the pistons on their joint movement to the motion transmitting member and forming firing chambers within the casing, means for controlling the movements of the outer piston in each cylinder with respect to the cooperating inner piston, and means for admitting explosive charges to the firing chambers and firing the charges in the cylinders and said chambers.

2. An internal combustion engine comprising a casing forming a chamber, a rotary shaft, a motion transmitting member fixed to the shaft to rotate with the shaft in the chamber, a series of cylinders carried by the casing, pistons operating in the cylinders, motion transmitting elements movable from an initial position in one direction by the pistons on a working motion thereof to transmit motion to the motion transmitting member and adapted to be moved in the opposite direction by the motion transmitting member back to such initial position and to retract the pistons, said elements forming abutments cooperating with the motion transmitting member to subdivide the chamber into firing compartments, and means for supplying explosive charges to the cylinders and to the firing compartments and for firing said charges in a predetermined order therein.

3. In an internal combustion engine, a housing forming a chamber, a rotary shaft extending through the chamber, a motion transmitting member disposed in the chamber and fixed to the shaft to rotate therewith, a set of segmentally curved cylinders grouped about the housing and having pistons operating therein, segmentally curved abutment members coupled to the pistons and movable across the housing chamber between the cylinders and motion transmitting member for transmitting motion from the pistons to said member, said members being operative to subdivide the housing chamber into explosion compartments, and means for supplying a combustible motive fuel to the cylinders and compartments and firing the charges of fuel therein.

4. In an internal combustion engine, a housing, a rotary shaft journaled therein, a motion transmitting cam rotating with the shaft and adapted to impart motion thereto, a series of cylinders on the housing having pistons operating therein, abutments coupled to the pistons and cooperating with the cam for forming an inner series of explosion chambers and adapted to transmit the forces of explosions in the cylinders and chambers to the cam, and means for firing the charges in a predetermined order in the cylinders and chambers.

5. In an internal combustion engine, a housing, a rotary shaft journaled therein, a motion transmitting cam rotating with the shaft and adapted to impart motion thereto, an outer series of explosion chambers on the housing, means cooperating with the cam for forming an inner series of explosion chambers and transmitting motion to the cam under the forces of explosions in both series of chambers, and means for firing the charges in a predetermined order in the chambers of each series.

6. In an internal combustion engine, the combination of a shaft, a motion transmitting element on the shaft, a housing structure about the shaft and motion transmitting element, an outer annular set of explosion chambers carried by the housing, means cooperating with the housing and motion transmitting elements to form an inner annular set of explosion chambers, and means for admitting explosive charges to and firing the charges in the explosion chambers of each set and transmitting the forces of the explosions through the first named means to the motion transmitting element.

7. In an internal combustion engine, the combination of a housing forming a chamber, a rotary shaft extending through the chamber, a motion transmitting member disposed in the chamber and fixed to the shaft for rotation therewith, a set of cylinders mounted on the housing, pistons operating in the cylinders, motion transmitting elements movable in the chamber between the cylinders and motion transmitting member and in contact with the latter for transmitting motion from the pistons to the motion transmitting member under the action of expanding gases in the cylinders and forming abutments operative in their movements and in the rotation of the motion transmitting member to subdivide the housing chamber into compartments for the reception and combustion of fuel charges therein and the action of the expanding gases therefrom on the motion transmitting member, and means for supplying combustible fuel charges to the cylinders and to the compartments and for firing the charges therein.

8. In an internal combustion engine, the combination of a housing forming a chamber, a rotary shaft extending through the chamber, a double-lobed motion transmitting cam disposed in the chamber and fixed to the shaft for rotation therewith, an annular set of radial cylinders mounted on the housing, pistons operating in the cylinders, motion transmitting elements movable in the chamber between the cylinders and cam and coupled to the pistons and contacting with the surfaces of the cam for transmitting motion from the pistons to the cam under the action of expanding gases in the cylinders and forming abutments operative in their movement and in the rotation of the cam to subdivide the housing chamber into compartments for the reception and combustion of fuel charges therein and the action of the expanding gases therefrom on the cam, and means for supplying combustible fuel charges to the cylinders and to the compartments and for firing the charges therein.

9. In an internal combustion engine, the combination of a housing forming a chamber, a rotary shaft extending through the chamber, a motion transmitting cam disposed in the chamber and fixed to the shaft for rotation therewith, a set of cylinders mounted on the housing, pistons operating in the cylinders, motion transmitting elements movable in the chamber between the cylinders and cam and in contact with the latter for transmitting motion from the pistons to the cam under the action of expanding gases in the cylinders and forming abutments operative in their movements and in the rotation of the cam to subdivide the housing chamber into compartments for the reception and combustion of fuel charges therein and the action of the expanding gases therefrom on the cam, and means for supplying combustible fuel charges to the cylinders and to the compartments and for firing the charges therein.

10. In an internal combustion engine, the combination of a housing, a shaft journaled therein, a motion transmitting element on the shaft, a set of cylinders on the housing, a pair of pistons in each cylinder jointly movable in one direction under force of the explosion of a combustible charge in the cylinder and movable independently in timed order in the opposite direction to admit a combustible charge between the pistons and force it through and compress it for a subsequent explosion in the cylinder, abutments coupled to the pistons for transmitting motion from the pistons on their joint movement to the motion transmitting element and forming therewith explosion chambers in the housing, and means for admitting combustible charges to the cylinders and chambers and firing the charges therein.

11. An internal combustion engine comprising a housing forming a chamber, a rotary shaft extending through the chamber, a double-lobed motion transmitting cam arranged within the chamber and fixed to the shaft to rotate therewith, an annular series of cylinders arranged about the housing and each communicating at one end therewith, pistons movable in the cylinders, motion transmitting abutments connected with the pistons and movable in the cylinders and in the chamber between the housing and motion transmitting cam, said elements being movable in one direction under working impulses of the pistons to subdivide the chamber into explosive compartments and to engage and transmit motion to the cam and being movable in the opposite direction by the cam for retraction and to retract the pistons, and means for admitting explosive charges to the cylinders and to the compartments and for firing the same to produce explosive forces for action on the pistons in the cylinders and on the abutments forming the compartments.

12. An internal combustion engine comprising a casing forming a chamber, a rotary shaft journaled therein, a motion transmitting double-lobed cam fixed to the shaft to rotate with the shaft in the chamber, a series of cylinders carried by the casing, an inner piston and an outer piston operating in each cylinder jointly movable in one direction under force of the explosion of a combustible charge in the cylinder and movable independently in timed order in the opposite direction to admit a combustible charge between the inner and outer pistons and force it through the outer piston and compress it for a subsequent explosion in the cylinder, motion transmitting abutments movable in one direction by the pistons on a working motion thereof to transmit motion to the cam and to subdivide the chamber into firing compartments and adapted to be moved in the opposite direction by the cam to an initial position and to retract the pistons, and means for supplying explosive charges to the cylinders and the firing compartments and for firing said charges in a predetermined order therein.

TRAVIS BAIN WOOLLEY.